July 4, 1933. C. G. HIGGINS 1,916,313
FOLDING HOOD FOR VEHICLES
Filed Feb. 7, 1930   3 Sheets-Sheet 3

INVENTOR
C.G. HIGGINS
BY
ATTORNEY

Patented July 4, 1933

1,916,313

UNITED STATES PATENT OFFICE

CHARLES GAUNTLETT HIGGINS, OF LONDON, ENGLAND

FOLDING HOOD FOR VEHICLES

Application filed February 7, 1930, Serial No. 426,631, and in Great Britain February 25, 1929.

This invention relates to folding hoods for automobiles and other vehicles and has for its object to provide an improved construction which enables a vehicle readily to be converted from an open or touring vehicle to a closed or saloon vehicle.

A further object of the invention is to provide a folding hood which comprises rigid panels and side flaps hinged about two lines at right angles and so mounted that when collapsed they can be lowered to a position between the drivers and rear seat.

With these and other objects in view, the invention consists in the improved arrangements and combinations embodied in the form of hood hereinafter described in detail, the novel features of which are set out in the claims which follow.

The complete hood is provided by a folding member as above and a similarly hinged folding member which provides the rear portion of the top, the back and side flaps that when collapsed can be lowered to a position between the rear seat.

To complete the conversion of the vehicle from an open or touring form to a closed or saloon vehicle, hinged window frames and guide members are provided which are normally folded down so as not to project above the line of the main body.

The hinged hood members are preferably carried by strips which are carried on vertical rods capable of being raised to bring the collapsed member to such height that it can be opened out.

In the accompanying drawings which illustrate the invention in a diagrammatic manner Fig. 1 represents a longitudinal cross-section through a vehicle body showing the hood in collapsed form in full lines and in extended form in dotted lines.

The hood consists of two main portions A, B which when folded or collapsed are housed respectively in a hollow partition C near the centre of the vehicle and a hollow compartment D in the rear.

The portion A is built in two parts and comprises a number of panels or flaps hinged vertically and horizontally when in the collapsed position, giving roof panels $a$, $b$, and side flaps $c'$ of the front and central part of the hood; the portion B comprises panels or flaps similarly hinged giving the rear top part $d$ of the hood, and the back part $e$ and sides $f$.

The flaps $a$ are hinged to top strips $h$ which are carried by vertical guide rods $g$ which are capable of being raised. The rear portion B is similarly carried by strips $j$ which pass over vertical guide rods $k$.

Figure 4:
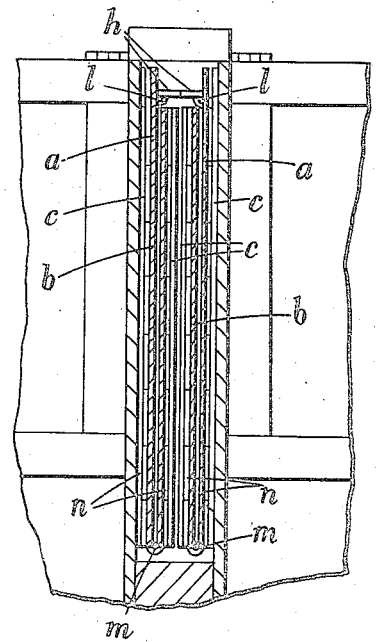
Fig. 4 represents to larger scale the central folding hood portion shown in Fig. 1.

In order to raise the central portion A and open it out, the two parts are lifted by the vertical guide rods until the flaps are clear of the partition C. The flaps $a$ are then turned about the horizontal hinges $l$ until the flaps $a$ are horizontal and the flaps $b$ are then turned about the hinges $m$ until they are in horizontal extended form. The side flaps $c$ which in the example illustrated are of trapezoidal form are next turned about the hinges $n$ which are vertical in the position shown in Fig. 4 and the central portion is now fully opened, the hinges running transversely and longitudinally of the vehicle.

The rear portion B opens similarly.

The closed vehicle is completed by the window frames E which are pivoted about hinges F and normally fit within recesses J in the solid lower part of the body; these window frames have holes X which, when the window is in raised position, register with vertically movable rods L by means of which the frames are locked in vertical position.

Figure 1:
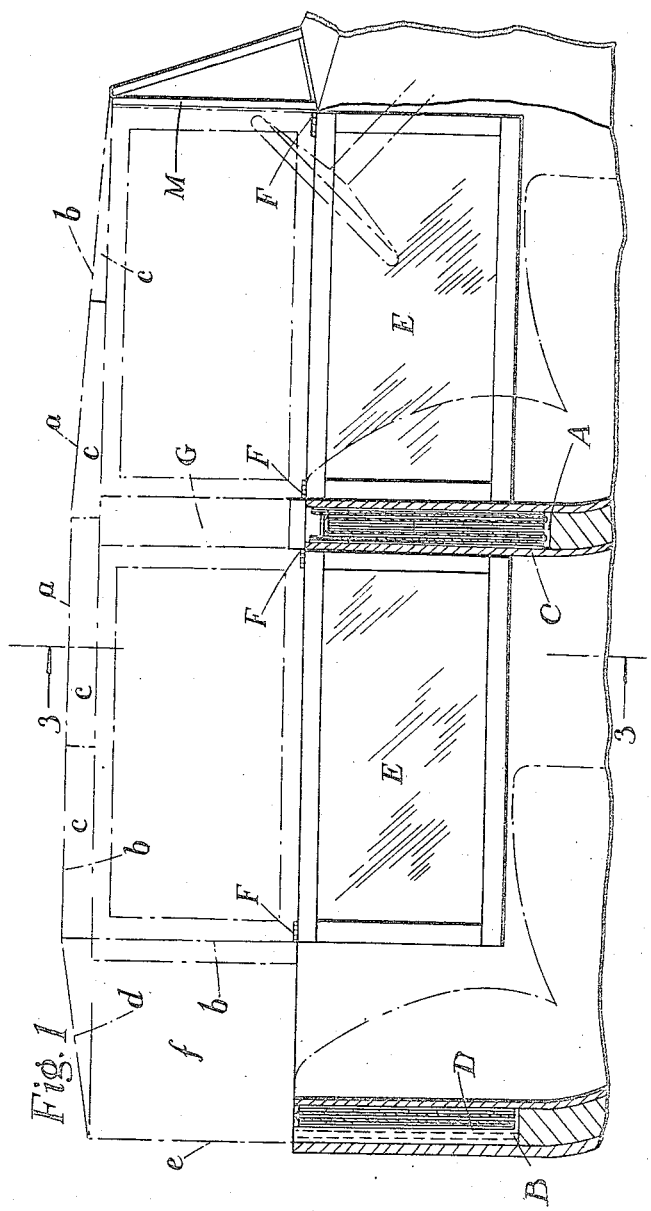
Figure 2:
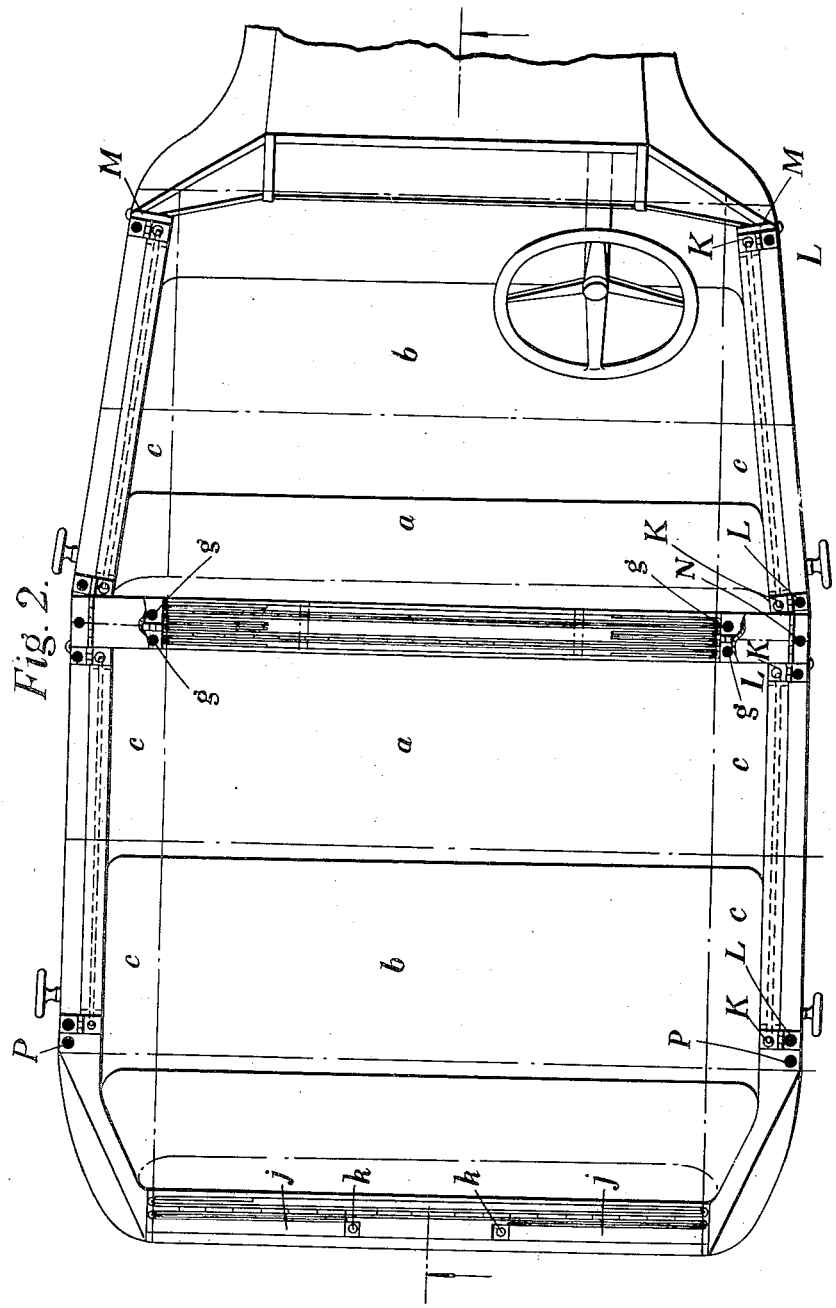
Fig. 2 represents a plan view with the parts in the position which they occupy when the vehicle is in open form.
Figure 3:
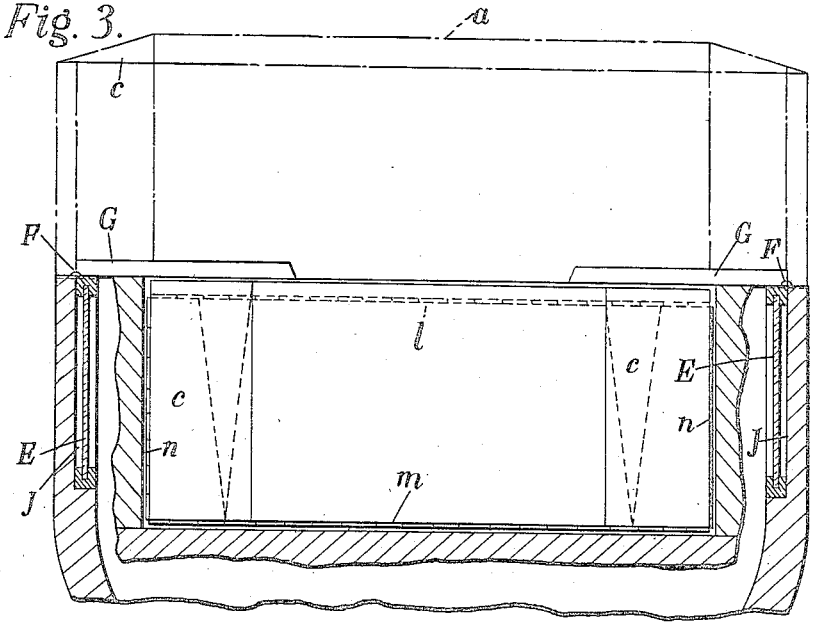
Fig. 3 represents a cross-section through the lines 3—3 of Fig. 1.

These window frames are guided by the windscreen member M and by means of a central hinged member G which normally has the position shown in Fig. 3, but which can be moved about a horizontal hinge and is maintained in vertical position by movable vertical guides N. Similarly hinged rear guides O are held in vertical position by rods P.

I claim:

1. A folding cover for a vehicle comprising side window frames carried by said vehicle, rigid roof panels carried by said vehicle and hingedly connected together on lines transversely of the vehicle, and side flaps hinged to each of said panels on lines longitudinally of the vehicle, said side flaps being adapted to connect said panels and said side window frames.

2. A folding cover for a vehicle comprising side panels carried by said vehicle, rigid roof panels carried by said vehicle and hingedly connected together on lines transversely of the vehicle, and side flaps hinged to each of said roof panels on lines longitudinally of the vehicle, said side flaps being adapted to connect said roof panels and said side panels.

3. A folding cover for a vehicle comprising side panels carried by said vehicle, members slidable vertically of said vehicle, rigid roof panels hinged to said sliding members on lines transversely of the vehicle, side flaps hinged to said roof panels on lines longitudinally of the vehicle and adapted when unfolded to connect each of said roof panels and said side panels, and a recess in the vehicle for the reception, when folded, of said roof panels and said side flaps.

4. A folding hood structure for a vehicle for use in converting an open vehicle into a closed vehicle comprising a vertical rod carried by the vehicle, two rectangular panels hinged for movement on lines transverse the vehicle with respect to said rod, additional rectangular panels hinged on lines transverse the vehicle to the first mentioned panels, and a trapezoidal flap hingedly connected to each side of each panel on lines longitudinally of the vehicle, said flaps when in extended position combining with the panels to form a complete roof structure.

5. A folding hood for vehicles including two panels, each hinged at one transverse edge, a vertical rod on which the hinged connection of the panels is mounted, a second panel hinged on lines transverse the vehicle and to that edge of each first mentioned panel remote from the hinged connection of said first mentioned panel, and flaps hingedly connected to the panels on lines extending longitudinally of the vehicle at right angles to the hinged connections between the panels, said panels and flaps being movable through the vertical rod from a lowered to an elevated position and together when opened out constituting a complete roof for the vehicle.

In testimony whereof I affix my signature.

CHARLES GAUNTLETT HIGGINS.